(12) United States Patent
Rosado et al.

(10) Patent No.: US 9,130,470 B2
(45) Date of Patent: Sep. 8, 2015

(54) POWER CONVERTER CONTROL SYSTEM AND METHOD WITH SEPARATE PRIMARY AND SECONDARY CONTROLLERS

(75) Inventors: Sebastian Pedro Rosado, Bayern (DE); Henry Todd Young, Erie, PA (US); Simon Herbert Schramm, Bayern (DE); Alvaro Jorge Mari Curbelo, Bavaria (DE); Jason Daniel Kuttenkuler, Erie, PA (US); Paolo Soldi, Bavaria (DE)

(73) Assignee: General Electric Company, Schenectady, NY (US)

( * ) Notice: Subject to any disclaimer, the term of this patent is extended or adjusted under 35 U.S.C. 154(b) by 222 days.

(21) Appl. No.: 13/618,690

(22) Filed: Sep. 14, 2012

(65) Prior Publication Data
US 2014/0078782 A1  Mar. 20, 2014

(51) Int. Cl.
H02M 3/335 (2006.01)
(52) U.S. Cl.
CPC ................................ H02M 3/33584 (2013.01)
(58) Field of Classification Search
USPC ....................................................... 363/17–26
See application file for complete search history.

(56) References Cited

U.S. PATENT DOCUMENTS

| | | | |
|---|---|---|---|
| 5,027,264 A | 6/1991 | DeDoncker et al. | |
| 5,745,358 A * | 4/1998 | Faulk | 363/95 |
| 7,859,861 B2 * | 12/2010 | Taurand et al. | 363/17 |
| 8,456,868 B2 * | 6/2013 | He et al. | 363/20 |
| 2009/0129123 A1 * | 5/2009 | Taurand et al. | 363/17 |
| 2011/0121774 A1 * | 5/2011 | Shimada | 318/729 |
| 2011/0242854 A1 * | 10/2011 | Minami et al. | 363/17 |

OTHER PUBLICATIONS

Li Gong, Ke Dai, Jingjing Chen, Yunhui Huang, Yong Kang; Design and Implementation of Distributed Control System for Cascaded H-Bridge Multilevel STATCOM; article; 2011; 1544-1551; 978-1-4244-8085-2/11 IEEE; College of Electric and Electronics Engineering, CEEE, Huazhong University of Science and Technology, HUST; Wuhan, China.

Young-Min Park, Ji-Yoon Yoo, Sang-Bin Lee; Practical Implementation of PWM Synchronization and Phase-Shift Method for Cascaded H-Bridge Multilevel Inverters Based on a Standard Serial Communication Protocol; article; Mar./Apr. 2008; 634-643; vol. 44, No. 2; IEEE Transactions on Industry Applications.

Hua Bai and Chris MI: Eliminate Reactive Power and Increase System Efficiency of Isolated Bidirectional Dual-Active-Bridge DC-DC Converters Using Novel Dual-Phase Shift Control; IEEE Transactions on Power Electronics, vol. 23, No. 6, pp. 2905-2914, Nov. 2008.

(Continued)

*Primary Examiner* — Matthew Nguyen
*Assistant Examiner* — Nusrat Quddus
(74) *Attorney, Agent, or Firm* — GE Global Patent Operation; John A. Kramer

(57) ABSTRACT

A power converter control system includes primary bridge controller that is configured to actuate a first plurality of gate drive units that switch a first plurality of power elements in a primary bridge of a power converter. The control system further includes a secondary bridge controller separate from the primary bridge controller that is configured to actuate a second plurality of gate drive units to switch a second plurality of power elements in a secondary bridge of the power converter.

18 Claims, 4 Drawing Sheets

(56) References Cited

OTHER PUBLICATIONS

F. Krismer, S. Round, J.W. Kolar; Performance Optimization of a High Current Dual Active Bridge with a Wide Operating Voltage Range; ETH Zurich, Power Electronic Systems Laboratory; Zurich, Switzerland.

Oliver D. Patterson and Deepakraj M. Divan; Pseudo-Resonant Full Bridge DC/DC Converter; IEEE Transactions on Power Electronics, vol. 6, No. 4, pp. 671-678, Oct. 1991.

Amit Kumar Jain and Rajapandian Ayyanar, PWM Control Dual Active Bridge: Comprehensive Analysis and Experimental Verification; IEEE Transactions on Power Electronics, vol. 26, No. 4, Apr. 2011.

Nikolaus Schibli; Symmetrical Multilevel Converters With Two Quadrant DC-DC Feeding; Ecole Polytechnique Federale De Lausanne; THÈSE No. 2220 (2000).

German G. Oggier, Guillermo O. Garcia and Alejandro R. Oliva; Switching Control Strategy to Minimize Dual Active Bridge Converter Losses, EEE Transactions on Power Electronics, vol. 24, No. 7, Jul. 2009.

* cited by examiner

POWER CONVERTER CONTROL SYSTEM AND METHOD WITH SEPARATE PRIMARY AND SECONDARY CONTROLLERS

BACKGROUND

1. Technical Field

Embodiments of the invention relate generally to electronic devices such as power converters. Other embodiments relate to power converter control systems.

2. Discussion of Art

In the mining industry, large off-highway vehicles ("OHVs") are used to haul heavy payloads excavated from open pit mines. OHVs usually employ electrically motorized wheels for propelling or retarding the vehicle in an energy efficient manner. In particular, OHVs typically utilize a large horsepower diesel engine in conjunction with an alternator, a main traction inverter, and a pair of wheel drive assemblies housed within the rear tires of the vehicle. The diesel engine is directly associated with the alternator such that the diesel engine drives the alternator. The alternator powers a main traction power converter, in which power semiconductor devices commutate the alternator output current to provide electrical power having a controlled voltage and frequency for electric drive motors of the two wheel drive assemblies.

Power converters suitable for use with OHV include, for example, an isolated bidirectional H-bridge converter that features two full semiconductor bridges connected through a power transformer. Such a converter can transfer power in both directions with voltages at primary and secondary sides varying within a range.

An isolated H-bridge converter, or other power electronics, may include power elements, e.g., switchable semiconductor devices, such as insulated gate bipolar transistors, (IGBTs), that are switched on and off by drive circuitry in an alternating fashion to produce an output AC waveform. Other types of power elements may also be used in the H-bridge circuit such as power BJT transistors, power MOSFETs, integrated gate commutated thyristors (IGCT), gate turn-off thyristors (GTO), or any other device controllable semiconductor switched by a low power signal (gate signal).

Typically, each power element within a power converter is switched on and off by gate voltage supplied from a gate drive unit. The gate drive unit typically is controlled via a wired connection from a control unit. The control units, however, may be physically remote from the gate drive unit. Moreover, OHVs are typically used under challenging environmental conditions that impose risks of physical damage to wired connections such as fiber optic or electrical cabling that may be used for routing signals from a control unit to a gate drive unit. Other types of equipment including power converters, such as for example industrial robots, may also be exposed to challenging environmental conditions.

Accordingly, it may be desirable to provide power converter control systems that differ from systems currently available.

BRIEF DESCRIPTION

In embodiments, separate controllers are present at each side of a power converter, with minimum amount of interconnection between those controllers. For example, a power converter control system may include a primary bridge controller and a secondary bridge controller separate from the primary bridge controller. The primary bridge controller is configured to actuate a first plurality of gate drive units that switch a first plurality of power elements in a primary bridge of a power converter. The secondary bridge controller is configured to actuate a second plurality of gate drive units that switch a second plurality of power elements in a secondary bridge of the power converter.

Another embodiment relates to a power converter comprising a transformer, a primary bridge, and a secondary bridge. The transformer has a primary coil and a secondary coil. The primary bridge comprises a first plurality of power elements connected between primary terminals and the primary coil of the transformer. The secondary bridge comprises a second plurality of power elements connected between secondary terminals and the secondary coil of the transformer. The power converter further comprises a first plurality of gate drive units respectively operably coupled to the first plurality of power control elements and to a primary bridge controller. The first plurality of gate drive units is configured to be actuated by the primary bridge controller to switch the first plurality of power elements. The power converter further comprises a second plurality of gate drive units respectively operatively coupled to the second plurality of power elements and to a secondary bridge controller that is separate from the primary bridge controller. The second plurality of gate drive units is configured to be actuated by the secondary bridge controller to switch the second plurality of power elements.

Another embodiment relates to a method, e.g., a method for controlling a power converter. The method comprises switching power elements of a primary bridge in a power converter, under control of a primary bridge controller, to commutate current from primary terminals of the power converter to a primary coil, with the primary coil exciting a secondary coil. (A first voltage is present at the primary terminals.) The method further comprises observing a second voltage of the primary coil (e.g., sensing or calculating the second voltage), and switching power elements of a secondary bridge in the power converter, according to the second voltage of the primary coil and under control of a secondary controller, for commutating current from the secondary coil to secondary terminals of the power converter.

As used herein, "primary" refers to components on the converter side that send power to the "secondary" side. "Secondary" refers to components on the converter side that receive the power from the "primary" side and transmits it to a load. Therefore, when power flow reverses, the primary and secondary terminology changes accordingly.

BRIEF DESCRIPTION OF THE DRAWINGS

These and other features and aspects of the invention will become better understood when the following detailed description is read with reference to the accompanying drawings in which like characters represent like parts throughout the drawings, wherein.

DETAILED DESCRIPTION

Exemplary embodiments of the invention relate to distributed control of a dual (bi-directional) H-bridge power converter. The power converter has a primary and a secondary side, each one with a set of controlled semiconductor devices commanded to convert electric power from one waveform to another. The power converter is capable of transforming power between the two sides in both directions; however, in some situations it may be required to operate in only one direction.

Typically, control of this type of power converter is done in a centralized way, where a single controller commands the semiconductors at both the primary and secondary sides. This requires that the sensing and actuating signals coming to and from the controller are routed to and from each side of the converter. In some cases this routing is difficult to achieve with the required level of quality, and may be undesirable due to distances and/or environmental conditions. Therefore, in some aspects, it is proposed to use a control system with two separate controllers at each side of the bidirectional power converter with minimum amount of interconnection between those controllers.

To achieve the proposed decentralization, in some embodiments, the controller at the receiving energy side measures or estimates the evolution of transformer winding voltage at the sending end. In embodiments where the opposite side transformer winding voltage signal is not available, the controller calculates or estimates that signal from its own side measurements. In certain embodiments, opposite side transformer winding voltage is estimated based on an observer, model inversion, or other algorithm that allows obtaining the desired voltage. In embodiments providing bidirectional power conversion, opposite side voltage observation occurs at both sides of the power converter. In embodiments where the converter will convert power in only one direction, an opposite side voltage observation is optional at the power sending side. Nevertheless, it may be useful to achieve a more efficient operation. Although in some aspects not necessary for regulation purposes, embodiments may include communication between the two sides for enabling (start/stop) signaling and fault trip protection.

The invention is especially useful in situations where the environmental conditions render difficult routing of signals from the controller to the power electronics gate drive units, which is usually done using fiber optic or electrical cabling. One example of such conditions can be found in mining equipment and other off-highway vehicles (OHV's).

Figure 1:
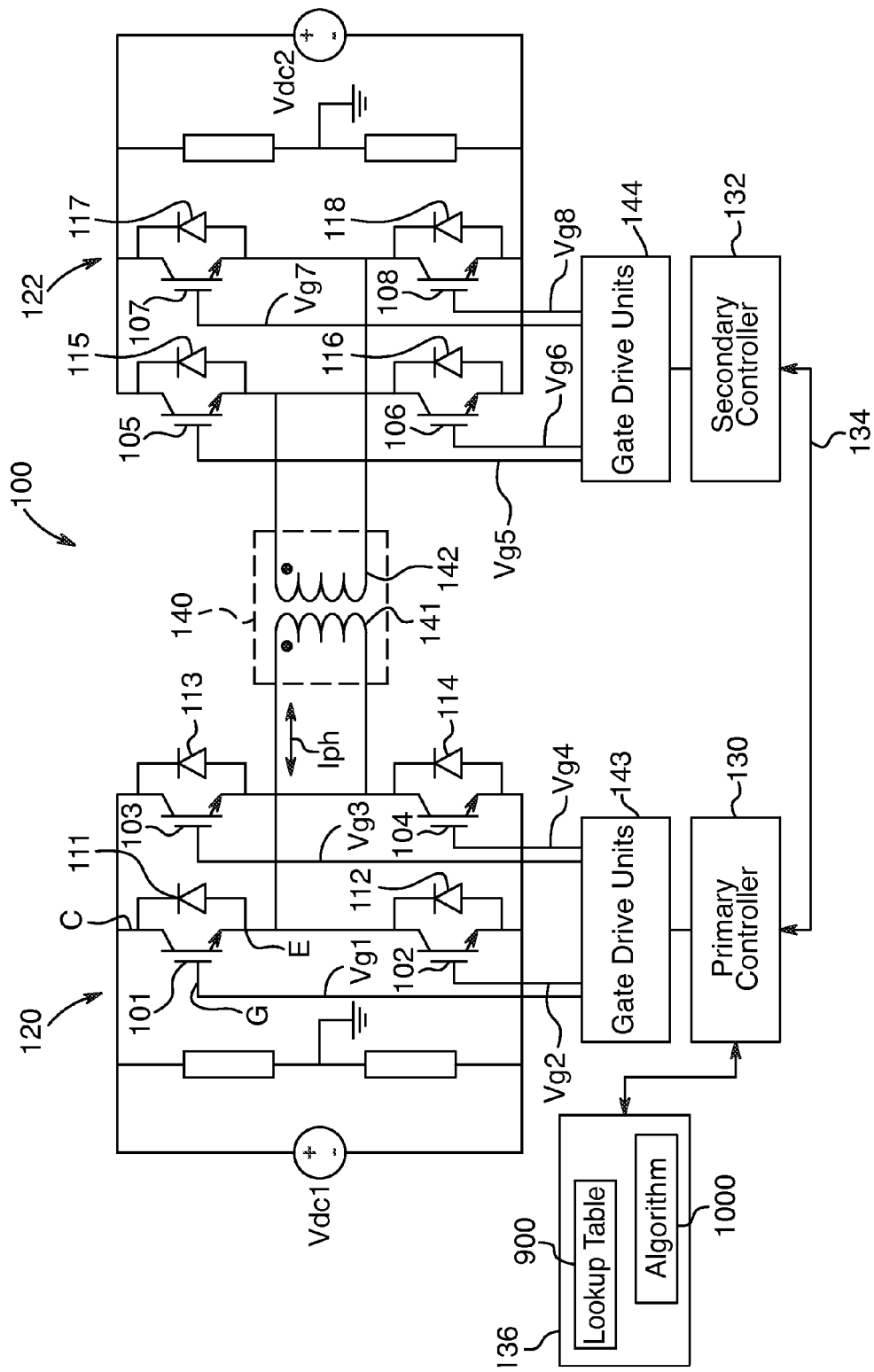
FIG. 1 is a schematic view of an isolated H-bridge power converter, according to embodiments of the present invention.

Accordingly, FIG. 1 illustrates an exemplary embodiment of the invention, in which a single phase isolated bi-directional H-bridge power converter 100 receives a DC supply voltage "Vdc1" and provides a DC load voltage "Vdc2." The power converter 100 includes a plurality of semiconductor power elements or other switches 101, 102, 103, 104, 105, 106, 107, 108. Each power element has a collector C, a gate G, and an emitter E. Each power element also has a corresponding flyback diode 111, 112, 113, 114, 115, 116, 117, 118 connected anti-parallel (collector to diode cathode, and emitter to diode anode) across the collector C and the emitter E.

Power elements 101, 102, 103, 104 and their associated flyback diodes 111, 112, 113, 114 are arranged to form a primary bridge 120 while power elements 105, 106, 107, 108 and their flyback diodes are arranged to form a secondary bridge 122. The primary bridge 120 is connected to commutate the DC supply voltage Vdc1 to provide AC current "Iph" across a primary coil 141 of a transformer 140. The secondary bridge 122 is connected to provide the DC load voltage Vdc2 by commutating the AC current on a secondary coil 142 of the transformer 140.

Within the power converter 100, power element 105 is "homologous" to power element 101, in that power element 101 is connected to the high terminal of the primary coil 141 (primary transformer winding), while power element 105 is connected to the high terminal of the secondary coil 142 (secondary transformer winding), so that each of the power elements in its own bridge functions similarly to the homologous power element in its respective bridge. Similarly, power elements 102-106, 103-107, and 104-108 also are homologous pairs.

The power elements 101, 102, etc. of the primary bridge 120 can be switched ON or OFF by gate voltage signals "Vg1", "Vg2", etc. to commutate the primary DC voltage Vdc1 for providing AC current Iph to the primary transformer coil 141, as further discussed below. The power elements 105, 106, etc. of the secondary bridge 122 are switched ON or OFF by gate voltage signals "Vg5", "Vg6", etc. to commutate the secondary coil AC voltage for providing a stepdown DC voltage Vdc2.

Thus, FIG. 1 shows an isolated H-bridge converter 100, which includes primary and secondary semiconductor bridges 120, 122 connected through a power transformer 140. By appropriately coordinating commutation of the primary and secondary bridges 120, 122, the converter 100 can transfer power in either direction across the transformer 140 while maintaining DC voltages Vdc1, Vdc2 within pre-determined ranges. In each case there will be a primary or supply side switched by a primary bridge, for sending power to the other or secondary side, which receives the power and transfers the power to a load via a secondary bridge.

Although FIG. 1 specifically illustrates an exemplary embodiment wherein the semiconductor devices used as power elements are isolated gate bipolar transistors (IGBTs), the present invention is also applicable to other solid state semiconductor devices, including, by way of non-limiting examples: bi-mode isolated gate transistors; MOSFETs; and/or JFETs. In select embodiments of the present invention, each power element and its corresponding flyback diode together may form a switching module as further discussed in a co-pending U.S. application Ser. No. 13/454,292, filed Apr. 24, 2012 ("the '492 application"), which is hereby incorporated by reference in its entirety.

In embodiments, the power converter 100 is controlled to maintain output voltage according to a set value or time function. Output voltage Vdc2 is controlled by introducing a bridge-to-bridge phase shift "dsh" between the primary and secondary bridges 120, 122. This phase shift is a fraction of the AC voltage in the primary and secondary transformer coils 141, 142. Power transfer across the converter is a function of the phase shift dsh, the primary and secondary voltages and the transformer impedance. In general, a larger bridge-to-bridge phase shift causes greater power transfer if the voltages are constant. In the case the power transfer is a given value the phase shift will change the voltage at the receiving side. Therefore, the phase shift dsh can be used to regulate the voltage.

Referring still to FIG. 1, in aspects of the present invention, control of the power converter 100 is partitioned into a primary bridge controller 130 and a secondary bridge controller 132, such that each controller 130 or 132 controls the power elements 101 . . . of the respective primary or secondary bridge 120 or 122. The primary controller 130 controls generation of the primary bridge gate voltages Vg1 . . . Vg4. The secondary controller 132 controls generation of the secondary bridge gate voltages Vg5 . . . Vg8. More specifically, a first plurality of gate drive units 143 is coupled to the primary controller 130, and a second plurality of gate drive units 144 is coupled to the secondary controller 132. Inputs of the gate drive units are driven by control signal outputs of the controllers, and outputs of the gate drive units are respectively electrically attached to the gates of the power elements. Examples of suitable gate drive units may be found in the '492 application. The gate drive units may be partially or wholly integrated together with the controllers, or they may be separately packaged or otherwise separate from the controllers. The primary and secondary controllers 130, 132 are coordinated for the purpose of sending the gate voltage signals Vg1 . . . Vg8 to the semiconductor power elements 101 . . . 108, according to a pre-defined schedule, so as to control transfer of electrical power from the DC supply to the DC load.

The power converter 100 may be used to convert power in both directions. Therefore, in embodiments, each of the controllers 130 and 132 is configured to schedule gate voltages so as to achieve the desired bridge-to-bridge phase shift dsh. In some applications, it is possible that either controller 130 or 132 or the two of them sense the AC voltage at the transformer terminals of the opposite side bridge. This could involve "high sample rate" (greater than about ten (10) times the operating frequency of the transformer 140) wired signal connections between the two sides of the power converter.

In other embodiments, high sample rate waveform measurements are not made. Instead, the primary and secondary controllers 130, 132 can be coordinated by "low data rate" (less than about ten (10) times the operating frequency of the transformer 140) signals transmitted from one to the other via a communication link 134. In select embodiments, the communication link 134 may be wireless. In select embodiments, one unit (typically the primary unit 130) is the "master," while the other unit (typically the secondary unit 132) is the "slave." The slave unit cycles its associated bridge according to a timing signal received from the master unit, via the communication link 134.

In other embodiments, high sample rate waveform measurements are not made and no timing signal is transmitted. Instead, each controller 130, 132 estimates the opposite transformer winding voltage, and independently determines an appropriate bridge-to-bridge phase shift, based on the time evolution or waveform of the AC voltage at the same side transformer terminals. Suitable estimation methods are based on pre-defined relationships. Such predefined relationships include mathematical relationships linking locally measurable variables, such as DC voltage and gate timing, to the remote (other side) AC voltage and/or current. Such embodiments are significantly less vulnerable to physical damage by comparison to a single central controller, or by comparison to distributed controllers relying on direct waveform measurements of opposite side voltage.

Meanwhile, in particular embodiments where the bridge is used to transfer power in only one direction, single side measurement/estimation can be used. It is also possible that instead of relying on measurement or estimation of the voltage magnitude at the sending power side, the receiving bridge controller determines an appropriate bridge-to-bridge phase shift based on a timing signal that is generated from local measurements related to the sending side voltage.

Therefore, a few different degrees of separation or independence could be implemented in various aspects and embodiments. The highest degree of separation corresponds to the sending and receiving sides working independently. The required signals at the other side are estimated and the only interconnection is an electrical state used to start/stop (enable) and to transmit protection trips. The next degree of separation includes sending a timing signal to the receiving side. Another degree of separation includes exchanging timing signals between the two sides. A further degree of separation includes direct measurement of opposing side voltage in at least one of the controllers. The lowest degree of separation includes a master-slave relationship, where one controller drives the other.

Figure 2:
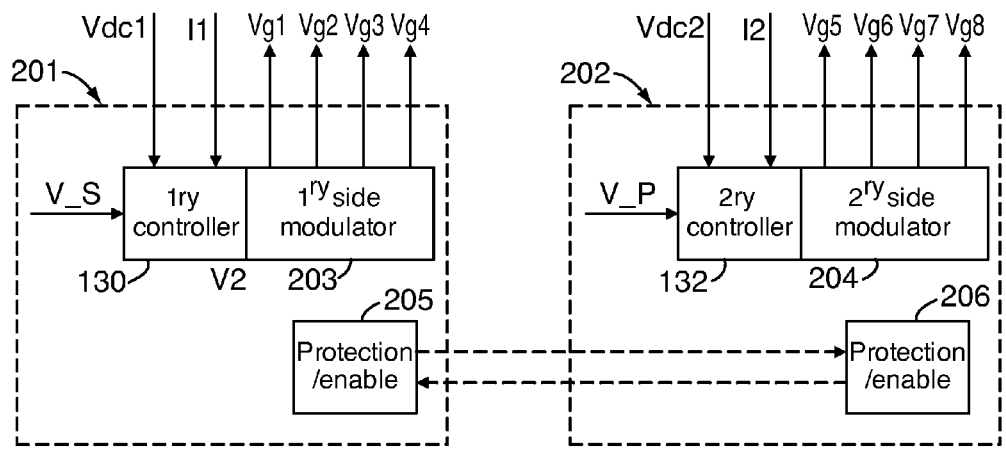
FIG. 2 is a schematic view of a combination of primary and secondary controllers usable with the power converter of FIG. 1, according to an embodiment of the present invention.

FIG. 2 shows in schematic view an embodiment where each of the primary and secondary bridge controllers 130, 132 has available a measurement of voltage on the opposite converter side, obtained via the opposite bridge controller. In a primary control sub-system 201 (controller and gate drive units in combination), the primary bridge controller 130 ("1ry controller") receives measurements of AC voltage V_S across the secondary transformer winding or coil 142, along with measurements of DC supply current I1 and voltage Vdc1. The controller 130 interfaces with a primary side modulator 203 (comprising at least the first plurality of gate drive units 143, which are not shown in this view) ("1ry side modulator"), which sends gate voltages Vg1, . . . , Vg4 to the respective primary power elements 101, . . . , 104. In embodiments, the primary control system 201 also includes a protection/enable module 205, which interfaces with a similar module 206 within the secondary bridge controller 132, and which may be part of the primary controller 130. The protection/enable modules may be configured to at least one of: (i) deactivate system operation upon receipt of designated signals; or (ii) allow operation only when a signal is present, such that if the signal is no longer present due to a fault condition, operation of the system automatically ceases.

Still referring to FIG. 2, a secondary control sub-system 202 includes the secondary bridge controller 132 ("2ry controller") and a secondary side modulator 204 ("2ry side modulator"), which includes at least the second plurality of gate drive units 144 (not shown in this view). The secondary controller 132 receives measurements of AC voltage V_P across the primary transformer winding or coil 141, along with measurements of DC load current I2 and voltage Vdc2. The secondary controller 132 interfaces with the secondary side modulator 204, which sends gate voltages Vg5, . . . , Vg8 to respective secondary power elements 105, . . . , 108.

The opposite side AC voltage measurements V_P, V_S, along with the protection/enable signals, can be transmitted via the communication link 134 as discussed above with reference to FIG. 1.

Figure 3:
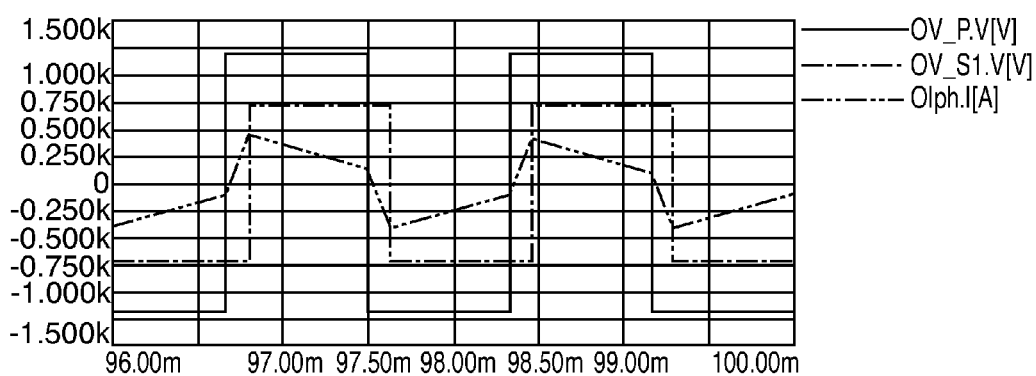
FIG. 3 shows voltage and current waveforms at primary and secondary transformer windings of the power converter of FIG. 1, according to one aspect of the present invention.

FIG. 3 shows a simulation of an embodiment according to FIG. 2, where the dual H-bridge power converter 100 is operated by the proposed primary and secondary side or bridge controllers 130, 132 with full sensing of opposite side voltage. In the illustrated embodiment, the primary bridge 120 is the power sending side while the secondary bridge 122, with lagging phase shift, receives the power. In particular, FIG. 3 shows exemplary waveforms of the primary side current Iph and of the primary and secondary DC voltages, labeled V_P and V_S1, respectively. The bridge-to-bridge phase shift is implemented in the secondary bridge controller 132, based on measurements of voltage and current.

Figure 4:
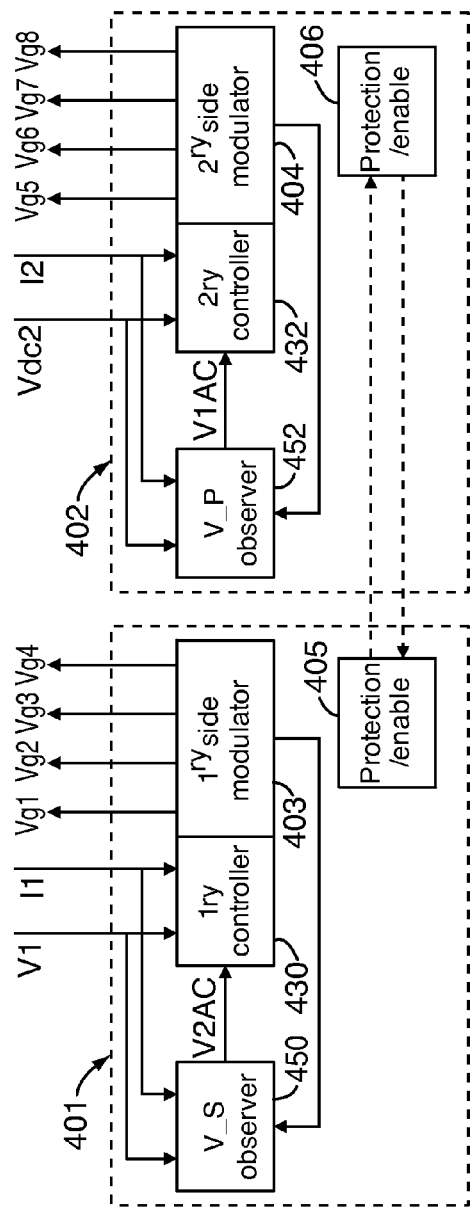
FIG. 4 is a schematic view of a combination of primary and secondary controllers usable with the power converter shown in FIG. 1, according to another embodiment of the present invention.
Figure 5:
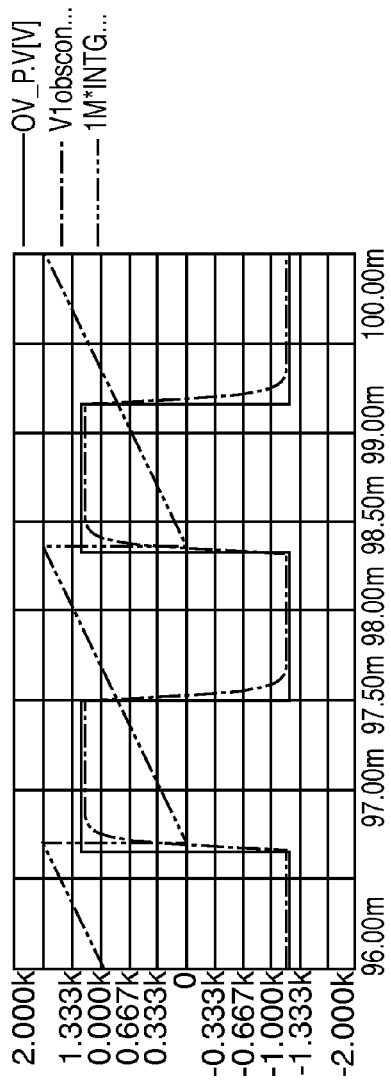
FIG. 5 shows a sawtooth timing signal generated by a primary windings voltage observer, according to aspects of the present invention.
Figure 6:
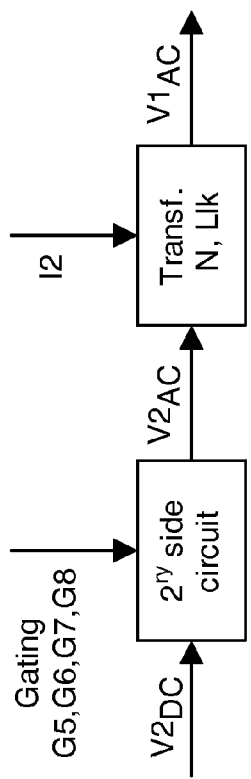
FIG. 6 shows in block diagram an algorithm for estimating transformer primary AC voltage based on secondary DC voltage.

FIG. 4 shows in schematic view an embodiment where a primary control sub-system 401 includes a primary bridge controller 430 along with an observer module 450 for estimating voltage at the opposite secondary bridge 122, while a secondary control sub-system 402 includes a secondary bridge controller 432 along with another observer module 452 for estimating voltage at the opposite primary bridge 120. For example, the observer 452 receives inputs of DC load voltage and current Vdc2 and I2, as well as the secondary bridge gate signals generated by a secondary side modulator 404. Thus, in the illustrated embodiment, the observer 452 can generate an estimated value V1ac of the instantaneous primary side AC voltage V_P, based on local DC voltage sensed concurrently with local gate signals. In certain aspects, the primary voltage observer 452, based on the estimated value V1ac, may generate a sawtooth timing signal INTG as shown in FIG. 5. Additionally, in certain aspects, the observer 452 can account for transformer properties. For example, the observer 452 may estimate V1ac based on: V2dc; the transformer 140 windings ratio N; an estimated leakage current Llk; and the gate voltages Vg5, . . . , Vg8, as shown in FIG. 6.

Figure 7:
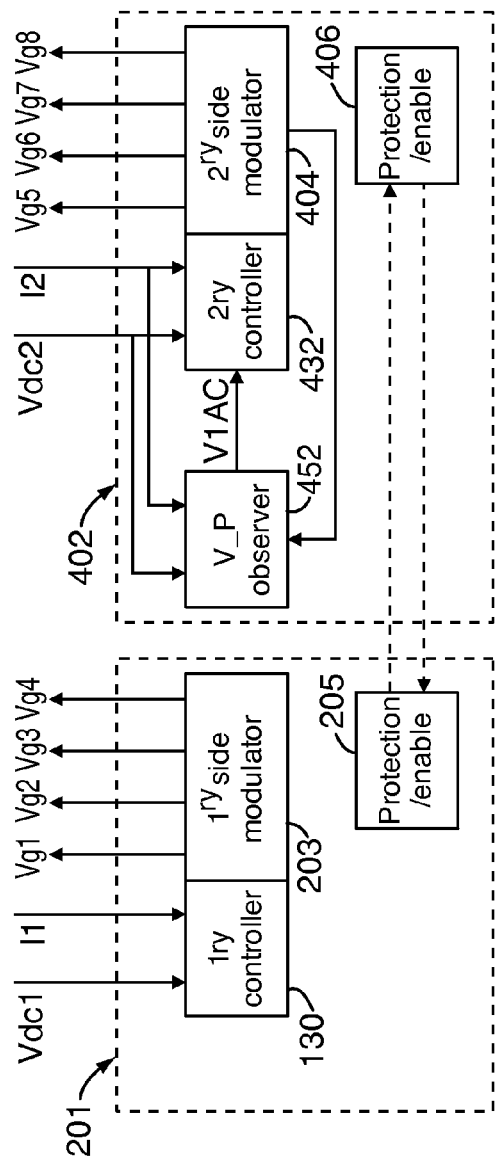
FIG. 7 is a schematic view of a combination of primary and secondary controllers usable with the power converter shown in FIG. 1, according to yet another embodiment of the present invention.

FIG. 7 shows in schematic view a special case of the embodiment shown in FIG. 4, where power transmission is unidirectional and an observer is used only in the secondary control sub-system 402 for estimating voltage of the primary side. Although a measurement of secondary side voltage V_S may be provided to the primary controller 132, such a measurement is not strictly necessary to this embodiment.

Thus, in embodiments, a power converter control system includes a primary bridge controller and a secondary bridge controller separate from the primary bridge controller. The primary bridge controller is configured to actuate a first plurality of gate drive units that switch a first plurality of power elements in a primary bridge of a power converter. The secondary bridge controller is configured to actuate a second plurality of gate drive units that switch a second plurality of power elements in a secondary bridge of the power converter. In select embodiments, the secondary bridge controller is configured to actuate the second plurality of gate drive units based on directly measuring a waveform of AC voltage at the primary bridge. In other embodiments, the secondary bridge controller is configured to actuate the second plurality of gate drive units in response to a signal transmitted by the primary bridge controller. For example, the transmitted signal may be a sawtooth waveform. In other embodiments, the secondary bridge controller is configured to actuate the second plurality of gate drive units based on a local estimation of an AC voltage at the primary bridge. In select embodiments, the local estimation is an estimated waveform. In certain aspects, the local estimation is based on a pre-defined relationship of the local gating signals and of a local DC voltage to the AC voltage at the primary bridge. In such aspects, the local current and the parameters of the transformer also can be inputs to obtain more accurate results of the local estimation. The estimation of the primary voltage can be used to generate a local synchronizing signal.

In other embodiments, a power converter includes a transformer, a primary bridge, and a secondary bridge. The transformer includes a primary coil and a secondary coil. The primary bridge includes a first plurality of power elements connected between primary terminals. The secondary bridge includes a second plurality of power elements connected between secondary terminals. Each of the first plurality of power elements is configured to be switched by a corresponding one of a first plurality of gate drive units, which are respectively operably coupled to the power elements. Each of the first plurality of gate drive units is configured to be actuated by a primary bridge controller. Each of the second plurality of power elements is configured to be switched by a corresponding one of a second plurality of gate drive units, which are respectively operably coupled to the power elements. Each of the second plurality of gate drive units is configured to be actuated by a secondary bridge controller separate from the primary bridge controller. In select embodiments, the secondary bridge controller is configured to actuate the second plurality of gate drive units based on directly measuring a waveform of AC voltage at the primary bridge. In other embodiments, the secondary bridge controller is configured to actuate the second plurality of gate drive units in response to a signal transmitted by the primary bridge controller. For example, the transmitted signal may be a sawtooth waveform. In other embodiments, the secondary bridge controller is configured to actuate the second plurality of gate drive units based on a local estimation of an AC voltage at the primary bridge. In select embodiments, the local estimation is an estimated waveform. In certain aspects, the local estimation is based on a pre-defined relationship of a local DC voltage to the AC voltage at the primary bridge. In other embodiments, the local estimation is a locally-generated timing signal. For example, the timing signal may be based on a local DC voltage sensed concurrently with local gate signals.

In some aspects, a voltage is provided at primary terminals of a power converter. Power elements of a primary bridge in the power converter are switched, via a primary bridge controller, to commutate current from the primary terminals to a primary coil. The primary coil excites a secondary coil. A voltage on the primary coil is observed, and a secondary controller is operated, according to the observed voltage of the primary coil, to switch power elements of a secondary bridge in the power converter for commutating current from the secondary coil to secondary terminals of the power converter. In certain aspects, the observed voltage of the primary coil is observed by local estimation at the secondary controller.

Thus, embodiments and aspects of the invention relate to distributed control of a power converter via primary and secondary controllers associated with primary and secondary bridges in the power converter. As a result, control related wired connections between the primary and secondary bridges may be minimized or eliminated. Thus, risks of physical damage to the power converter are reduced by reducing a risk of injury to cabling. Therefore, in certain aspects, the present invention enables enhanced reliability of power converter operation under injurious environmental conditions.

As discussed herein, in embodiments, a power converter includes a primary bridge, a secondary bridge, a primary bridge controller, and a second bridge controller that is separate from the primary bridge controller. According to one aspect, "separate" means that each controller is individually able to control the gate drive units associated with its bridge, such that if either controller was completely electrically isolated from the other, it would still be able to control the gate drive units of its bridge. Separate may also include different housings or sub-housings, having different microprocessors or other integrated circuits or other electronics that are not shared between the two controllers, and/or being electrically isolated except for a transformer connection or connection to common ground.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to illustrate embodiments of the invention, they are by no means limiting and are exemplary in nature. Other embodiments may be apparent upon reviewing the above description. The scope of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," "3$^{rd}$," "upper," "lower," "bottom," "top," "up," "down," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described embodiments, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A power converter control system comprising:
   a primary bridge controller configured to actuate a first plurality of gate drive units that switch a first plurality of power elements in a primary bridge of a power converter; and
   a secondary bridge controller separate from the primary bridge controller and configured to actuate a second plurality of gate drive units that switch a second plurality of power elements in a secondary bridge of the power converter,
   wherein the secondary bridge controller is configured to actuate the second plurality of gate drive units based on a direct measurement by the secondary bridge controller of a waveform of AC voltage across a primary transformer winding at the primary bridge.

2. A power converter control system as claimed in claim 1, wherein the secondary bridge controller is configured to actuate the second plurality of gate drive units in response to a signal transmitted by the primary bridge controller.

3. A power converter control system as claimed in claim 2, wherein the transmitted signal is a sawtooth waveform.

4. A power converter control system comprising:
   a primary bridge controller configured to actuate a first plurality of gate drive units that switch a first plurality of power elements in a primary bridge of a power converter; and
   a secondary bridge controller separate from the primary bridge controller and configured to actuate a second plurality of gate drive units that switch a second plurality of power elements in a secondary bridge of the power converter,
   wherein the secondary bridge controller is configured to actuate the second plurality of gate drive units based on estimation, by an observer module co-located with the secondary bridge controller, of an AC voltage at the primary bridge.

5. A power converter control system as claimed in claim 4, wherein the estimation is an estimated waveform.

6. A power converter control system as claimed in claim 4, wherein the estimation is based on a pre-defined relationship of a local DC voltage to the AC voltage at the primary bridge based on local gating signals.

7. A power converter control system as claimed in claim 4, wherein the estimation is a locally-generated timing signal.

8. A power converter control system as claimed in claim 7, wherein the timing signal is based on a local DC voltage sensed concurrently with local gate signals.

9. A power converter comprising:
   a transformer comprising a primary coil and a secondary coil;
   a primary bridge comprising a first plurality of power elements connected between primary terminals and the primary coil of the transformer;
   a first plurality of gate drive units respectively operably coupled to the first plurality of power control elements and to a primary bridge controller, the first plurality of gate drive units configured to be actuated by the primary bridge controller to switch the first plurality of power elements;
   a secondary bridge comprising a second plurality of power elements connected between secondary terminals and the secondary coil of the transformer; and
   a second plurality of gate drive units respectively operatively coupled to the second plurality of power elements and to a secondary bridge controller that is separate from the primary bridge controller, the second plurality of gate drive units configured to be actuated by the secondary bridge controller to switch the second plurality of power elements, and the secondary bridge controller configured to actuate the second plurality of gate drive units based on directly measuring a waveform of AC voltage across the primary coil at the primary bridge.

10. A power converter as claimed in claim 9, wherein the secondary bridge controller is configured to actuate the second plurality of gate drive units in response to a signal transmitted by the primary bridge controller.

11. A power converter as claimed in claim 10, wherein the transmitted signal is a sawtooth waveform.

12. A power converter as claimed in claim 9, wherein the secondary bridge controller is configured to actuate the second plurality of gate drive units based on a local estimation of an AC voltage at the primary bridge.

13. A power converter as claimed in claim 12, wherein the local estimation is an estimated waveform.

14. A power converter as claimed in claim 12, wherein the local estimation is based on a pre-defined relationship of a local DC voltage to the AC voltage at the primary bridge.

15. A power converter as claimed in claim 12, wherein the local estimation is a locally-generated timing signal.

16. A power converter as claimed in claim 15, wherein the timing signal is based on a local DC voltage sensed concurrently with local gate signals.

17. A method comprising:
  switching power elements of a primary bridge in a power converter, under control of a primary bridge controller, to commutate current from primary terminals of the power converter to a primary coil, a first voltage being present at the primary terminals, and the primary coil exciting a secondary coil;
  observing at a secondary controller an AC waveform of the primary coil; and
  switching power elements of a secondary bridge in the power converter, under control of the secondary controller according to the AC waveform of the primary coil, for commutating current from the secondary coil to secondary terminals of the power converter.

18. A method as claimed in claim 17, wherein the AC waveform of the primary coil is observed by local estimation at the secondary controller.

* * * * *